(12) United States Patent
Major et al.

(10) Patent No.: US 12,450,706 B2
(45) Date of Patent: Oct. 21, 2025

(54) METHOD FOR FINDING IMAGE REGIONS THAT SIGNIFICANTLY INFLUENCE CLASSIFICATION IN A TOOL FOR PATHOLOGY CLASSIFICATION IN A MEDICAL IMAGE

(71) Applicants: AGFA Healthcare NV, Mortsel (BE); VRVIS Zentrum für Virtual Reality und Visualisierung Forschungs-GmbH, Vienna (AT)

(72) Inventors: David Major, Mortsel (BE); Dimitrios Lenis, Mortsel (BE); Maria Wimmer, Mortsel (BE); Gert Sluiter, Mortsel (BE); Astrid Berg, Mortsel (BE); Katja Buehler, Mortsel (BE)

(73) Assignees: AGFA HEALTHCARE NV, Mortsel (BE); VRVIS ZENTRUM FÜR VIRTUAL REALITY UND VISUALISIERUNG FORSCHUNGS—GMBH, Vienna (AT)

( * ) Notice: Subject to any disclaimer, the term of this patent is extended or adjusted under 35 U.S.C. 154(b) by 408 days.

(21) Appl. No.: 17/915,570

(22) PCT Filed: Mar. 30, 2021

(86) PCT No.: PCT/EP2021/058267
§ 371 (c)(1),
(2) Date: Sep. 29, 2022

(87) PCT Pub. No.: WO2021/198238
PCT Pub. Date: Oct. 7, 2021

(65) Prior Publication Data
US 2023/0144724 A1    May 11, 2023

(30) Foreign Application Priority Data
Apr. 2, 2020    (EP) .................................... 20167717

(51) Int. Cl.
*G06T 5/00*    (2024.01)
*G06T 5/77*    (2024.01)
(Continued)

(52) U.S. Cl.
CPC .............. *G06T 5/77* (2024.01); *G06T 7/0012* (2013.01); *G06V 10/764* (2022.01); *G06T 2207/20081* (2013.01); *G06T 2207/30068* (2013.01)

(58) Field of Classification Search
None
See application file for complete search history.

(56) References Cited

U.S. PATENT DOCUMENTS

2011/0103706 A1* 5/2011 Jeong .................... G06T 11/001
                                            382/254
2021/0125313 A1* 4/2021 Bai ....................... G06V 10/806
(Continued)

FOREIGN PATENT DOCUMENTS

WO    WO-2021194361 A1 * 9/2021 ............... G06T 3/40

OTHER PUBLICATIONS

Agarwal et al., "Removing input features via a generative model to explain their attributions to an image classifier's decisions," https://arxiv.org/pdf/1910.04256v3.pdf, retrieved Sep. 21, 2020, 32 pp.
(Continued)

*Primary Examiner* — Thomas D Lee
(74) *Attorney, Agent, or Firm* — Leydig, Voit & Mayer, Ltd.

(57) ABSTRACT

A method for finding image regions that significantly influence classification in a tool for pathology classification in a medical image wherein image regions that influence classification are inpainted, by replacing the pixels in these
(Continued)

regions by representations of heathy tissue, resulting in an image with a healthy classification-score in the classification tool.

1 Claim, 4 Drawing Sheets

(51) Int. Cl.
*G06T 7/00* (2017.01)
*G06V 10/764* (2022.01)

(56) References Cited

U.S. PATENT DOCUMENTS

2021/0271914 A1* 9/2021 Keshwani ............... G06N 3/045
2022/0138956 A1* 5/2022 Palma ....................... G06T 5/77
382/131

OTHER PUBLICATIONS

European Patent Office, International Search Report in International Patent Application No. PCT/EP2021/058267, mailed Jun. 28, 2021, 3 pp.
European Patent Office, Written Opinion in International Patent Application No. PCT/EP2021/058267, mailed Jun. 28, 2021, 6 pp.
González-Gonzalo et al., "Iterative augmentation of visual evidence for weakly-supervised lesion localization in deep interpretability frameworks," Arixiv.org, Cornell University Library, Oct. 16, 2019, 10 pp.
Lenis et al., "Domain aware medical image classifier interpretation by counterfactual impact analysis," Arxiv.org, Cornell University Library, Jul. 13, 2020, 12 pp.

* cited by examiner

| P | $D_{ours}$ | $D_{cam}$ | $D_{sal}$ |
|---|---|---|---|
| 50 | 137.1±69.5 | 200.1±65.3 | 164.2±36.0 |
| 75 | 137.1±69.5 | 182.1±78.9 | 162.9±36.9 |
| 90 | 137.1±69.5 | 144.1±89.3 | 166.3±44.0 |
| Ablation | 163.3±35.9 | - | - |
| P | $H_{ours}$ | $H_{cam}$ | $H_{sal}$ |
| 50 | 227.1±82.1 | 359.3±83.9 | 371.3±61.5 |
| 75 | 227.1±82.1 | 308.5±103. | 350.3±63.1 |
| 90 | 227.1±82.1 | 232.2±121 | 328.9±64.5 |
| Ablation | 328.1±69.5 | - | - |

FIG. 3

| P | $A_{our}$ | $A_{ca}$ | $A_{sal}$ | $O_{cam}$ | $O_{sal}$ |
|---|---|---|---|---|---|
| 50 | .02±.0 | .43±.1 | .50±. | .60± | .86±.1 |
| 75 | .02±.0 | .24±.0 | .25±. | .44± | .64±.2 |
| 90 | .02±.0 | .10±.0 | .10±. | .23± | .39±.2 |

FIG. 4

METHOD FOR FINDING IMAGE REGIONS THAT SIGNIFICANTLY INFLUENCE CLASSIFICATION IN A TOOL FOR PATHOLOGY CLASSIFICATION IN A MEDICAL IMAGE

CROSS-REFERENCE TO RELATED APPLICATIONS

This patent application is the U.S. national phase of International Patent Application No. PCT/EP2021/058267, filed Mar. 30, 2021, which claims the benefit of European Patent Application No. 20167717.6, filed Apr. 2, 2020.

FIELD OF THE INVENTION

The present invention is in the field of clinical decision support. More specifically the invention relates to a method for finding and visualizing image regions that significantly influence classification in a tool for pathology classification in a medical image.

BACKGROUND OF THE INVENTION

Clinical applicability of automated decision support systems depends on a robust, well-understood classification interpretation. Consulting radiologists will routinely back their findings by pinpointing and describing a specific region in a radiograph.

Artificial neural networks (ANN) while achieving class-leading scores fall short in this regard. They act as highly efficient black box but fall short in explanation of their predictions. ANN's high dimensional, non-linear nature, does not induce a canonical map between derived prediction and input image.

Therefore, a plethora of approaches have been presented that try to derive a so-called saliency map, that is, a robust mapping between pixel space and prediction class.

Utilizing heuristic methodology like blurring and noise, they however tend to produce diffuse, and in times misleading results, hindering their general adoption.

Most frequently this form of reasoning is based on local explanations (LE), that is, on concrete maps for image-prediction pairs. A clinically applicable LE needs to be informative for the radiologists, i.e. focusing on regions coinciding with medical knowledge. Moreover, a methodologically sound LEs is faithful to the classifier, i.e. dependent on architecture, parametrization, and its preconditions like training-set distribution.

Direct approaches efficiently utilize the assumed analytic nature or the layered architecture of an ANN classifier to derive the desired saliency map for a LE. While frequently applied, the obtained results of this class are possibly incomplete, diffuse, hard to interpret, and as recent work shows misleading. Thereby they violate both criteria, informativeness and faithfulness, hindering their general application in medical imaging.

Contrary, reference based LE approaches try to mitigate these issues by studying how the given classifier reacts to perturbations of the input image. Using the original input as a reference and marginalizing a dedicated image region's contribution, they estimate this region's effect on the classification score. Solutions mainly vary in how this marginalization is achieved, from heuristic approaches, e.g. blurring, noise, or graying out, to local neighbourhood conditioning, to utilizing strong conditional generative models. These methods address informativeness, however, applied to medical images, they introduce noise, possibly pathological indications, anatomical implausible tissue or other adversarial artefacts. By this, they amplify the out-of-distribution problem, similar to an adversarial attack: they expect a meaningful classification result for an image not within the training-set distribution. Hence, they fall short of the needed faithfulness for clinical applications.

Marginalization for medical imaging, i.e. the replacement of pathological regions with counterfactual healthy tissue, is being actively explored and addressed by generative adversarial network setups (GANs). Besides promising results, authors report resolution limitations, and the same underlying out-of-distribution issue.

In a publication by Chirag Agarwal et al.: "Removing input features via a generative model to explain their attributes to an image classifier's decisions", 14 Feb. 2020, XP 05573298 a generative inpainting model is disclosed used to remove pixels from an input image and fill it with content that is plausible under the true data distribution.

The document does not relate to medical imaging, more specifically not to medical images containing a pathology. The described method works on images containing objects or scenery and is different from the method of the present invention.

In the publication by Cristina Gonzalez-Gonzalo et al.: "Iterative augmentation of visual evidence for weakly-supervised lesion localization in deep interpretability frameworks" the idea of inpainting attributed regions of an image, aiming at changing a pathology-classifiers decision is disclosed.

The method described by González-Gonzalo differs from the method of present invention by the way in which an attribution (a map) is found.

In the method disclosed in this document an external saliency method is utilized iteratively (possible choices are listed in table 1 of this document):
(i) a map is derived using the external saliency method,
(ii) all regions attributed through this map are inpainted,
(iii) the result of above step is classified.

Then the method starts over with step (i) until some threshold is reached. The final map is a weighted sum of the iteration-steps.

In the method of the present invention no external method is used:
(i) the method of this invention starts from a random map,
(ii) the regions attributed through this map are inpainted,
(iii) a loss function is defined that characterises a valid solution for the map,
(iv) through stochastic gradient decent on this loss function the map is optimized directly.

It is an aspect of the present invention to provide a faithful and informative medical black-box classifier interpretation, by expanding natural image-classifier visualization approaches.

SUMMARY OF THE INVENTION

The above-mentioned advantageous effects are realised by a method having the specific steps as set out in claim 1.

Specific features for preferred embodiments of the invention are set out in the dependent claims.

Further advantages and embodiments of the present invention will become apparent from the following description and drawings.

The present invention is based on a reference-based optimization framework tailored to medical images, focusing on the interactions between original and marginalized image classification-scores and map quality.

To tackle anatomical correctness of marginalization in medical images, partial convolution inpainting is adapted.

Partial convolution inpainting is known from G. Liu, F. A. Reda, K. J. Shih, T.-C. Wang, A. Tao and B. Catanzaro, "Image inpainting for irregular holes using partial convolutions", in Proceedings of ECCV, 2018, pp. 85-100.

Instead of a globally acting generative adversarial network GAN, local per-pixel reconstruction is used without sacrificing global image composition.

This approach was validated on publicly available mammography data, and shows quantitatively and qualitatively more precise localization, and clearer conveying results than existing state-of-the-art methods.

BRIEF DESCRIPTION OF THE DRAWINGS

FIG. 5($a$) depicts the original image overlayed with mass annotation ocntours, (b) shows results of our saliency map ping framework, (c) is the CAM classifier and (d) visualizes SAL, both thresholded with $50^{th}$ percentile.

DETAILED DESCRIPTION OF THE INVENTION

The goal of the present invention is to estimate a faithful and informative saliency map between a medical image and its classification score: given an image, we search for and visually attribute the specific pixel-set that contributes towards a confident classification for a fixed class.

A class represents the label of a distinct group after stratification of all possible diagnosis based on a medical image. An example could be: pathological/no findings; benign/pathological.

Figure 1:
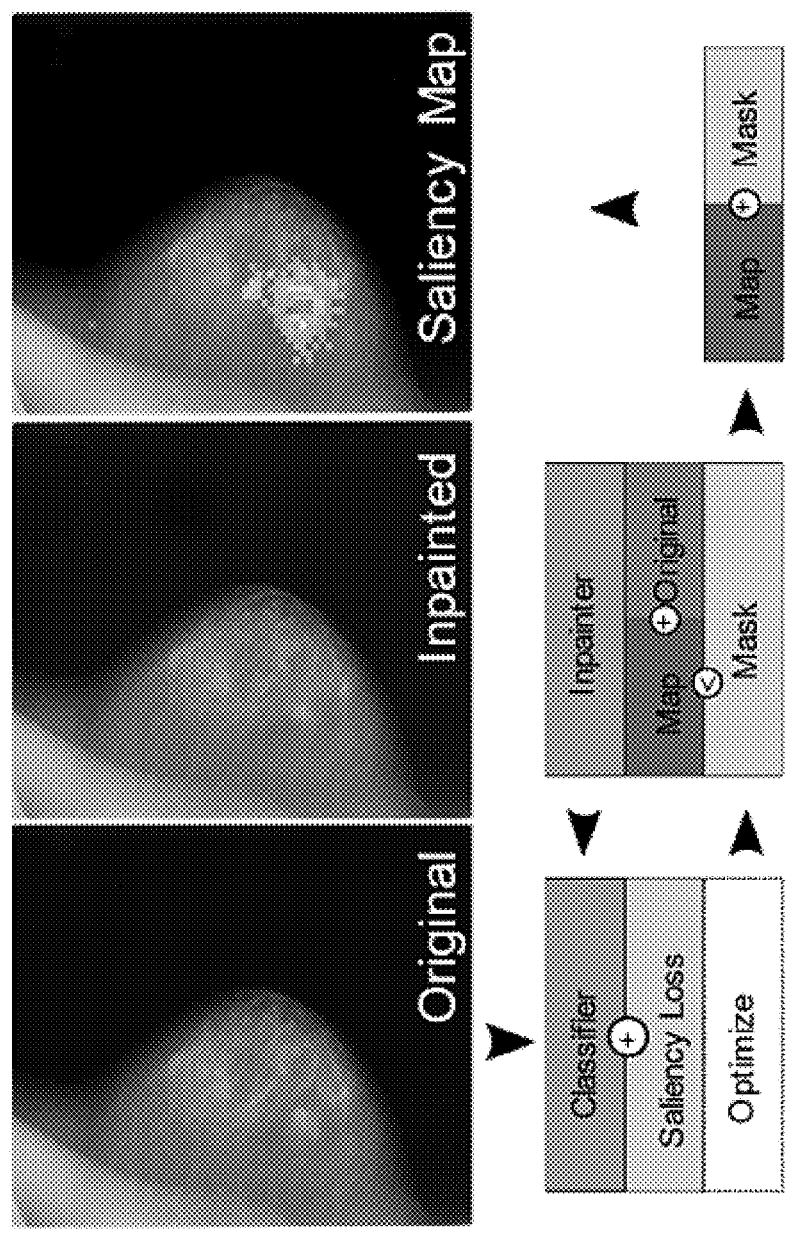
FIG. 1 illustrates successive steps of the present invention.

FIG. 1 illustrates the method of the present invention. The saliency mapping framework comprises the following steps:
(1) Obtaining a classification score of a medical image of interest, i.e. deriving the probability of a class, given this particular image,
(2) Generating a hole mask, inpainting and classifying, (purposefully inpainted version of the original image of interest),
(3) Computing saliency loss based on the score difference of original and inpainted images and map quality, (This is achieved by deriving the difference of odds between the classification-score of the original image of interest and the new inpainted image, and weigh the results against the maps area and its total variation),
(4) Continuing optimization for a fixed number of steps (Repeating the above steps for a fixed number of iterations), and
(5) Deriving a result mask being a result binary map, i.e. a final hole result mask.

This result mask is converted into a visual image.

The general problem to be solved can be formulated as finding the smallest deletion region (SDR) of a class c, i.e. the pixel-set whose marginalization w.r.t. the classifier lowers the classification score for c.

Image-Wise Saliency Mapping:

Informally, we search for the smallest smooth map, that indicates the regions we need to change (inpaint) such that we get a sufficiently healthy image able to fool the classifier.

We formalize the problem as follows:

Let I denote an image of a domain I with pixels x on a discrete grid m1×m2, c a fixed class, and f a classifier capable of estimating p(c|I), the probability of c for I.

Also let $M_1$ denote the saliency mask for image I and class c, hence $M_1 \in M^{m1 \times 2}(\{0, 1\})$.

We use total variation tv ($M_1$), and size ar($M_1$), to measure the masks shape.

Total variation is generally defined as $tv(M) := \Sigma_{i,j}(M_{i,j} - M_{i,j+1})^2 + \Sigma_{i,j}(M_{i,j} - M_{i+1,j})^2$.

Note that size here is ambiguous. Experimentally we found dice overlap with regions-of-interest like organ-masks to be favourable over the maps average pixel value. With ⊗ denoting elementwise multiplication, and π(M) the inpainting result of a hole image I ⊗ M, we can define $\varphi(M) := -1 \cdot \log(p(c|\pi(M)))$ and $\psi(M) := \log(odds(I)) - \log(odds(\pi(M)))$, where $odds(I) = p(c|I)/1 - p(c|I)$. Both, $\varphi$ and $\psi$, weigh the new probability of the inpainted image.

If we assume class c to denote pathological, then healthy images, and large score differences will be favoured. With this preparation we define our desired optimization function as $$L(M) := \lambda_1 \cdot (\varphi(M) + \psi(M)) + \lambda_2 \cdot tv(M) + \lambda_3 \cdot ar(M)$$

where $\lambda_i \in \mathbb{R}$ are regularization parameters, and search for arg mints L (M).

There are two collaborating parts in L.

The first term enforces the class probability to drop, the latter two emphasize an informative mask. Focusing on medical images, L directly solves the SDR task, thereby minimizing medically implausible and adversarial artefacts caused by in painting of large classifier-neutral image regions.

The optimization problem is solved by local search through stochastic gradient descent, starting from a regular grid initialization. By design, no restrictions are applied on the classifiers f. For optimization we relax the masks domain to $M^{m1 \times m2}([0, 1])$, and threshold at $\theta \in (0, 1)$.

Image Inpainting with Partial Convolutions:

For marginalization, we want to emphasize local context, while still considering global joint region interaction, and thereby favor a globally sound anatomy. Therefore, we adapt the U-Net like architecture as described by G. Liu, F. A. Reda, K. J. Shih, T.-C. Wang, A. Tao and B. Catanzaro, "Image inpainting for irregular holes using partial convolutions", in Proceedings of ECCV, 2018, pp. 85-100, which is capable of handling masks with irregular shapes, fitting our optimization requirements for pathological-regions of different sizes and shapes. The chosen architecture consists of eight partial convolution layers on both encoding and decoding parts. It takes an image with holes I ⊗ M and the hole mask M as an input, and outputs the inpainted image π(M). The partial convolution layers insert only the convolution result of the current sliding convolution-window when image information is present. The convolution filter W is applied on the features X using the binary mask M and yield new features xi the following way:

$$x^i = W^T (X \otimes M) \frac{1}{\text{sum}(M)} + b \text{ if sum}(M) > 0$$

0 otherwise
where b is the bias term.

The convolution operation is scaled by $$\frac{1}{\text{sum}(M)}$$

according to the amount of information available in the current sliding window. Moreover a new mask $m^i$ is passed to the next layer which is updated by setting its values to 1 in the sliding window if sum(M)>0.

We train the network with a loss function concentrating on both per-pixel reconstruction performance of the hole, non-hole regions and on overall appearance of the image.

To improve the overall appearance a perceptual loss and a style loss is applied which match images in a mapped feature space. Total variation is used as a last loss component to ensure a smooth transition between hole regions and present image regions.

Experimental Set-Up

Dataset: In this work the Database for Screening Mammography (DDSM) as described by M. Heath, K. Bowyer, D. Kopans, R. Moore, and W. P. Kegelmeyer, "The digital database for screening mammography," in Proceedings of the 5th international workshop on digital mammography. Medical Physics Publishing, 2000, pp. 212-218 and the Curated Breast Imaging Subset of DDSM (CBIS-DDSM) as described by R. S. Lee, F. Gimenez, A. Hoogi, and D. Rubin, "Cu-rated Breast Imaging Subset of DDSM [Dataset]," The Cancer Imaging Archive, 2016 were used, downsampled to a resolution of 576×448 pixels. Data was split into 1231 scans containing masses and 2000 healthy samples for training, and into 334 mass and 778 healthy scans for testing. Scans with masses contain pixel-wise ground-truth annotation (GT).

Image Classifier: The basis of our saliency detection framework is a Mobilenet binary classifier to categorize images as healthy or as a sample with masses. The network was trained on all training scans with batch size of 4 using the Adam optimizer with a learning rate (lr) of 1e-5 for 250 epochs using early stopping. Rotation, zoom and horizontal, vertical flips were used for data augmentation. It was pre-trained by approx. 50k 224×224 pixel patches from the same data with the task of classifying background vs. masses.

Inpainting: The inpainter was trained on the healthy training samples with a batch size of 1 in two phases. The first phase was setup with batch normalization (BN) and lr=1e-5 for 100 epochs, the second without BN in the encoder part and with lr=1e-6 for 50 epochs. For each image up to 400 8×8 pixel holes were generated at random positions, where both single small holes and larger clusters were simulated to mimic configurations during optimization. The inpainter has the task to change the classification score of an image towards healthy when replacing mass tissue, no considerable change should happen otherwise. To demonstrate that, we computed (i) a ROC curve using the classifier on all test samples without any inpainting, (ii) ROC curves for inpainting only in healthy tissue over 10 runs with randomly sampled holes and (iii) for inpainting of mass tissue in unhealthy scans over 10 runs (see FIG. 2 left).

Saliency Mapping: Parametrization was experimentally chosen based on grid-search, restricted by $\lambda_i \in [0, 1]$, for i=1, 2, 3. We found the resulting masks to be especially sensitive to $\lambda_2$. This smoothness controlling term, balances between noisy result-maps and compression induced information-loss. We exemplify this behaviour with an ablation study, where contributions of smoothing and sizing are set to zero (cf. FIG. 3, Table 1). The final optimization results were derived in 100 steps per image, with lr=2e-3, θ=0.5 and setting $\lambda_1=1.0$, $\lambda_2, 3=0.1$.

We compared our approach against two established methods based on widespread adaptation in medical imaging, namely the methods described by C. F. Baumgartner, L. M. Koch, K. C. Tezcan, J. X. Ang, and E. Konukoglu, "Visual feature attribution using Wasserstein GANs," in Proceedings of CVPR, 2017, pp. 8309-8319 and by P. Rajpurkar, J. Irvin, K. Zhu, B. Yang, H. Mehta, T. Duan, D. Y. Ding, A. Bagul, C. Langlotz, K. S. Sh-panskaya, M. P. Lungren, and A. Y. Ng, "CheXNet: Radiologist-Level Pneumonia Detection on Chest X-Rays with Deep Learning," CoRR, vol. abs/1711.05225, 2017 and with inherent validity as described by J. Adebayo, J. Gilmer, M. Muelly, I. Goodfellow, M. Hardt, and B. Kim, "Sanity checks for saliency maps," in Proceedings of NIPS, 2018, pp. 9505-9515.

We chose the gradient based Saliency Map (SAL) and the network-derived Cam (CAM) visualizations. As our domain prohibits the utilization of blurring, noise, etc. we could not test meaningfully against reference based methods as described in L. M. Zintgraf, T. S. Cohen, T. Adel, and M. Welling, "Visualizing deep neural network decisions: Prediction difference analysis," in Proceedings of ICLR, 2017 and in R. C. Fong and A. Vedaldi, "Interpretable explanations of black boxes by meaningful perturbation," in Proceed-ings of ICCV, 2017, pp. 3429-3437 and in P. Dabkowski and Y. Gal, "Real time image saliency for black box classifiers," in Proceedings of NIPS, 2017, pp. 6967-6976.

For evaluation four measures were compared: (i) Average of distances between the centres of GT mask and the result masks (RM) connected components (D), (ii) Average Hausdorff-Distances (H) between GT masks and RM, (iii) Ratio between derived RM and the breast masks (A) indicating map sizes, and related (iv) Overlap coefficients (O) between our RM and those of CAM and SAL (cf. FIG. 3 Table 1, and FIG. 4, table 2). All measurements were performed on binary masks, for which CAM and SAL had to be thresholded as those maps noise covers the complete image. We thresholded at 50/75/90th percentile, i.e. 50/25/10 percentile of the map-points were used. Where multiple masses, or mapping results occurred we used their median for a robust estimation per image. Statistical significance between the resulting findings was formalized by p-value testing, using Wilcoxon Signed rank tests, for $\alpha < 0.01$.

Figure 2:
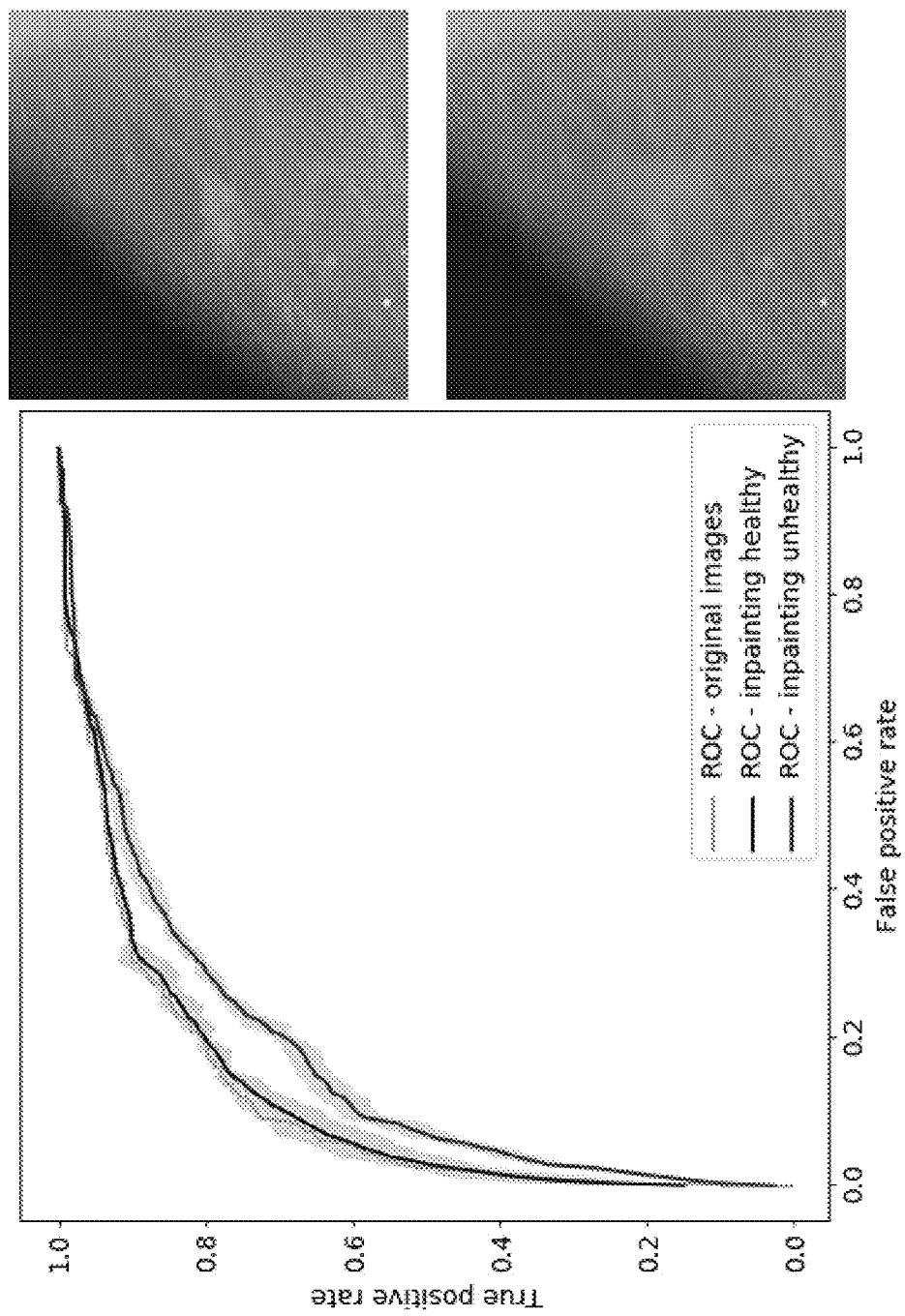
FIG. 2 left shows a comparison of a classifier performance without inpainting, with inpainting with healthy tissue and in mass tissue over 10 random runs (shadowed), FIG. 2 right shows the original image with mass (top image) and the inpainted image with replaced healthy texture (bottom image), FIG. 3 comprises table 1 expressing the results of the saliency mapping on test data with masses for different percentiles P: D . . . average Euclidean, H . . . average Hausdorff distances, between result mask connected components and ground-truth annotations (in pixels), FIG. 4, table 2 shows for three threshold-levels, chosen by percentiles of the output-distribution of CAM resp. SAL: A: Average overlaps between attributions and breast mask; O: Overlap between our attribution and CAM resp. SAL.

Results and Conclusions:

Inpainting Evaluation: The ROC curves in FIG. 2 represent an AUC of 0.89 for original images (green), average AUCs of 0.88 for inpainting tissue in healthy cases (blue) and 0.83 for inpainting only in masses for pathological cases (red). Besides the AUCs, the visual separability of the green/blue curves from the red one indicates that the inpainter behaves correctly and introduces significant changes only when re-placing mass tissue w.r.t. the classifier. The inpainting quality of replacing mass with healthy tissue is visible in FIG. 2 right.

Saliency Evaluation: Quantitatively, our framework yields saliency masks significantly closer to GT masks based on centre distances D, regardless of chosen mask thresholds (cfr. FIG. 2, Table 1). This statistical significance is substantiated with p-values below 2e-12, and can also be observed by the Hausdorff-Measures H in Table 1. Considering the map sizes A (FIG. 4, Table 2), we report overall significantly smaller masks, and p-values again below 2e-12. This changes when the shape-specific regularization parameters λ2, 3 are relaxed, as exemplified by the ablation study. As to be observed in the last row of both parts of Table 1, our feature attributions become scattered and noisy. Close inspection of the overlap-values, esp. O in Table 2, reveals that our method's attributions have on average a higher overlap with SAL than CAM. This indicates that our results tend to adhere to the dense localization spots of SAL, but alleviate the latter's noise and interpretation issue described in the prior art.

Figure 5:
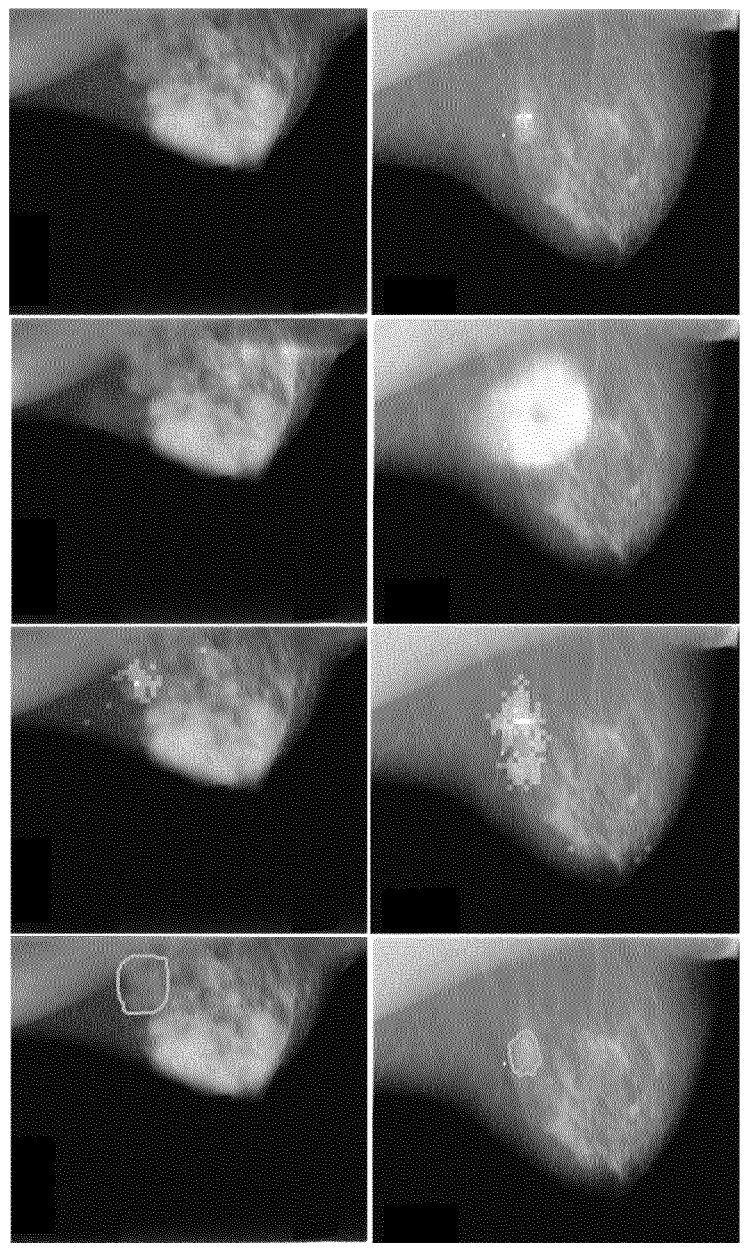
FIG. 5 shows result saliency heatmaps.

Qualitatively, as depicted in FIG. 5 (b), our salient regions appear at the circumference of masses which is reasonable w.r.t. the fact that this is the discriminative region for the presence of masses. This is similar to what is described by A. S. Becker, L. Jendele, O. Skopek, N. Berger, S. Ghafoor, M. Marcon, and E. Konukoglu, "Injecting and removing suspicious features in breast imaging with CycleGAN: A pilot study of automated adversarial attacks using neural networks on small images," European Journal of Radiology, vol. 120, pp. 108649, 2019 which reports also about injection of poorly circumscribed, malignant looking masses while transforming healthy cases into pathological ones using a GAN variant. In addition, our method yields more accurate visualizations than CAM and SAL (FIG. 5 first row) and has a smaller, more precise and thereby a more informative feature attribution than these standard visualization approaches (FIG. 5 (b)-(d)).

The invention claimed is:

1. A method for finding image regions that influence classification in a tool for pathology classification in a medical image, the method comprising:
    feeding said medical image to said pathology classification tool to yield an initial classification score,
    randomly initializing a binary map with attributed regions to yield a hole mask, wherein said attributed regions indicate image regions of said medical image,
    overlapping said binary map onto said medical image with the initial classification score to generate an input image,
    applying the input image to a convolution network, wherein the convolution network marginalizes said attributed regions through inpainting to generate an output image,
    feeding the output image to said tool for pathology classification to yield a new classification score, and
    successively updating the binary map by repeating the above steps and by optimizing a saliency loss function fed with (i) said binary map, (ii) said medical image with the initial classification score, and (iii) said new classification score,
    wherein said optimizing the saliency loss function comprises measuring (a) a shape and size of said attributions of said binary map and (b) a difference between the initial classification score and the new classification score after each successive update, whereby said attributions change so that (a) and (b) increase and said optimizing the saliency loss function converges or is stopped after a number of iterations.

* * * * *